United States Patent [19]
Reidemeister et al.

[11] Patent Number: 5,345,823
[45] Date of Patent: Sep. 13, 1994

[54] ACCELEROMETER

[75] Inventors: Eric P. Reidemeister, Arlington; Larry K. Johnson, North Attleboro; Keith W. Kawate, Attleboro Falls, all of Mass.; Raymond E. Mandeville, Cumberland, R.I.; Douglas B. Christensen, Attleboro, Mass.; Robert O. Southworth, Pawtucket, R.I.

[73] Assignee: Texas Instruments Incorporated, Dallas, Tex.

[21] Appl. No.: 790,956

[22] Filed: Nov. 12, 1991

[51] Int. Cl.$^5$ .......................................... G01P 15/125
[52] U.S. Cl. ...................... 73/517 R; 73/431; 73/497; 361/280
[58] Field of Search ............... 73/517 R, 517 B, 497, 73/431, 720, 721, 726, 727, 717, 718, 719, 722, 723, 724, 725, 728, 756; 361/280, 283.1, 283.4, 283; 29/25.41; 338/4

[56] References Cited

U.S. PATENT DOCUMENTS

| | | | |
|---|---|---|---|
| Re. 31,459 | 12/1983 | Block | 338/47 |
| 3,240,073 | 3/1966 | Pitzer | 73/517 |
| 4,267,731 | 5/1981 | Jacobson | 73/505 |
| 4,435,737 | 3/1984 | Colton | 361/280 |
| 4,469,923 | 9/1984 | Charboneau | 200/83 |
| 4,483,194 | 11/1984 | Rudolf | 73/517 |
| 4,736,629 | 4/1988 | Cole | 73/517 R |
| 5,058,430 | 10/1991 | Aske | 53/497 |
| 5,174,158 | 12/1992 | Kremidas | 73/727 |
| 5,239,871 | 8/1993 | Reidemeister et al. | 73/517 R |
| 5,257,547 | 11/1993 | Boyer | 73/727 |

FOREIGN PATENT DOCUMENTS

| | | | |
|---|---|---|---|
| WO-A-9113364 | 5/1991 | Int'l Pat. Institute | G01P 15/09 |
| 1138728 | 1/1965 | United Kingdom | G01P 15/125 |

Primary Examiner—Donald Woodiel
Attorney, Agent, or Firm—Russell E. Baumann; Richard L. Donaldson; René E. Grossman

[57] ABSTRACT

An accelerometer unit has a capacitor detect plate and a source place connector preferably defined respectively inside and outside a groove in one surface of a ceramic substrate. A flat metal member has an attachment portion secured in electrically conductive relation to the connector, has a source plate portion spaced over the detect plate to form a capacitor, and has integral resilient beams extending from the attachment portion to support the source plate portion spaced from the detect plate to be movable relative to the detect plate in response to acceleration force to provide an electrical signal. Preferably glass rods between the attachment member portion and source place connector facilitate the spacing. An electrically insulating housing base has integral pins extending through openings in the accelerometer unit substrate and in a separate electrical circuit unit to mount the circuit unit in spaced, overlying relation to the accelerometer unit, and an electrically conductive adhesive extends through guide holes in a gasket between the accelerometer and circuit units to electrically connect the circuit to the detect plate and to the connector on the ceramic substrate.

33 Claims, 6 Drawing Sheets

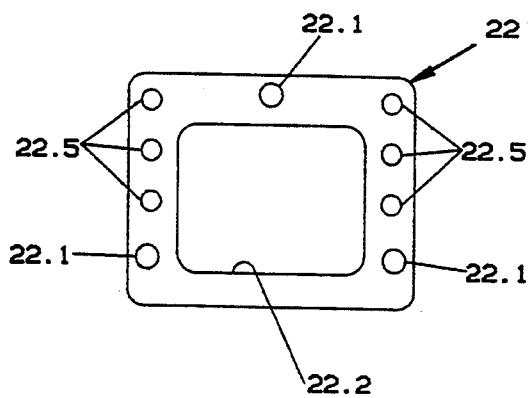
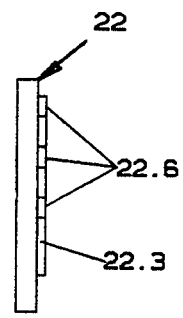
FIG. 10    FIG. 11
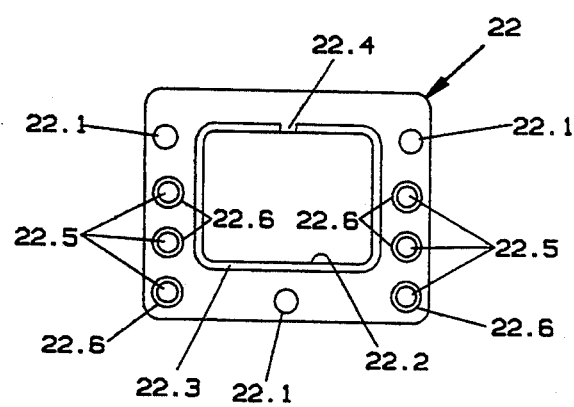
FIG. 12
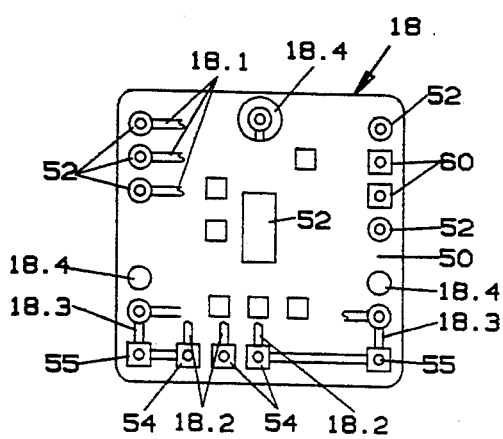
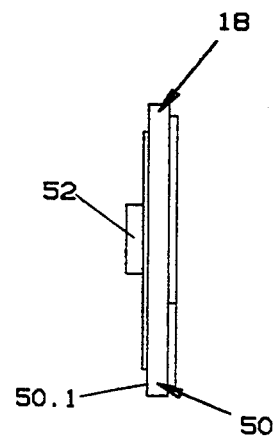
FIG. 13    FIG. 14

ACCELEROMETER

BACKGROUND OF THE INVENTION

The field of the invention is that of condition sensors, and the invention relates more particularly to sensors such as accelerometers having condition-responsive means which are mechanically movable for providing an electrical signal and which include electrical circuit means for conditioning the electrical signal.

Condition sensors such as capacitive accelerometers and the like of various types as shown in U.S. Pat. No. 4,483,194 to Rudolph, U.S. Pat. No. 4,435,737 to Colton, Reissue U.S. Pat. No. 31,549 to Block, and U.S. Pat. No. 3,240,073 to Pitzer are commonly used or proposed for use in aircraft and automotive applications and the like where the sensors are likely to be subjected to shock, vibration and severe temperature changes but where it would be desirable for the sensors to be inexpensive and to display reliable and accurate performance characteristics over a long service life. However, many such sensors have limited performance capability or are manufactured at excessive cost. It would be desirable if such sensors could be provided with improved reliability in performance and could be made at reduced cost to find wide application.

A related accelerometer device is shown in commonly-assigned, copending application for U.S. Pat., Ser. No. 07/628,249 filed Dec. 17, 1990 (18442).

BRIEF SUMMARY OF THE INVENTION

It is an object of the invention to provide a novel and improved condition-responsive sensor; to provide a novel and improved condition-responsive sensor such as an accelerometer device which is particularly adapted for use in vehicle applications; to provide such an accelerometer device which is characterized by improved reliability and responsiveness; to provide such an accelerometer device which has improved temperature independence; and to provide such an accelerometer device which is of compact, rugged structure adapted to withstand use in severe vehicle environments.

Briefly described, the novel and improved condition-responsive device of the invention comprises an accelerometer or the like having condition-responsive means which are movable in response to occurrence of a condition to provide an initial electrical signal. The condition-responsive means are associated in a novel way with electrical circuit means for amplifying, calibrating or otherwise conditioning the initial electrical signal to provide an output signal corresponding to the condition. In one preferred embodiment, the sensor comprises an accelerometer device having a discrete, separately-testable accelerometer unit having novel and advantageous performance characteristics which is arranged in an advantageous way relative to a discrete, separately-testable electrical circuit means to provide a compact, rugged and inexpensive accelerometer mechanism. The structure of the mechanism is such that it is easily assembled and also securely and reliably enclosed for projecting the mechanism over a long service life in a severe environment.

In a preferred embodiment of the invention, the discrete accelerometer unit includes a stiff, rigid, electrically-insulating ceramic substrate having a recess or groove formed in one substrate surface. Electrically conductive film means or the like are deposited on that surface to define a capacitor detect plate inside the recess, a capacitor source plate connector pad or the like outside the recess, and circuit paths which are connected to the detect plate and source plate connector and preferably to respective terminal pads formed along an edge of the substrate surface. The accelerometer unit further includes a flat, electrically-conductive plate member of stiffly resilient metal which is etched or the like to be provided with an attachment portion, with a capacitor source plate portion, and with integral resilient beam means in a common plane. The attachment portion of the member is secured in electrically conductive relation to the source plate connector on the substrate, and in that way, precisely positions the source plate portion of the member over the detect plate in the substrate recess to be movable along a first axis toward or away from the detect plate in response to acceleration force along that axis. In that way, the accelerometer unit is easily and reliably made to have uniform performance characteristics. The beam means are configured, and spacer means are provided on the source plate portion of the member to cooperate with the beam means, to reduce risk of damage to the beams if the accelerometer unit is dropped or otherwise exposed to excessive or off-axis acceleration force. The substrate and member materials are also selected to have the same thermal expansion properties to further improve unit performance.

In a preferred embodiment, the accelerometer device has an electrically insulating housing base having integral pins upstanding from the base, and the substrate of the accelerometer unit as above-described has slots or other openings which are fitted over the respective pins for locating the unit on the base. A signal-conditioning electrical circuit means such as a printed circuit board or the like having signal-conditioning components mounted on one side of the board is provided with corresponding openings which are also fitted over the respective pins. The distal ends of the pins are staked or otherwise headed-over for securing the circuit means in a fixed, overlying relation to the plate member in the accelerometer unit to form a compact and inexpensive accelerometer mechanism. In a preferred embodiment, a gasket means such as a gasket of picture-frame shape is disposed on the substrate around the plate member, and a cover of cup shape or the like is disposed over the gasket means to extend over the plate member for excluding contaminants from between the detect and source plates of the noted capacitor. The circuit unit rests on the cover. Preferably the cover, and even the gasket means if desired, are provided with corresponding openings which are also fitted over the noted pins so that the pins also serve to position and secure the cover and gasket means in assembled relation in the accelerometer mechanism. An electrically-conductive adhesive such as a silver-filled epoxy or the like is arranged for electrically connecting the signal-conditioning circuit components on the circuit board to the circuit paths on the substrate after the circuit means and accelerometer unit are assembled in the accelerometer mechanism. In a preferred embodiment, the cover and gasket have corresponding guide holes extending between the electrical circuit means and the substrate terminal paths for receiving the electrically-conductive adhesive therein to connect the circuit means to the detect plate and source plate on the substrate while preventing flow of adhesive between the detect and source plates in the accelerometer unit capacitor. Preferably hollow rivets provided on the circuit board extend into holes in the cover to be connected to the adhesive and for locating the circuit board relative to the cover and gasket to permit the conductive adhesive to be introduced into the holes in the cover and gasket after assembly of the circuit means, cover, gasket and substrate on the base pins. Preferably a second housing part is secured to the housing base for enclosing the accelerometer mechanism.

In one preferred embodiment, shield means are disposed in at least partially surrounding relation to the electrical circuit means and substrate in the accelerometer mechanism for shielding the mechanism from electromagnetic interference, and preferably the shield means also have openings fitted over the pins in the housing base for securing the shield means in assembled relation with the accelerometer mechanism. Preferably the shield means comprises a metal sheet having six integral sides drawn or foldable to define a cube surrounding the accelerometer mechanism.

In that arrangement, the accelerometer unit and the electrical circuit means are each adapted to be made and tested individually. They are adapted to be easily and accurately assembled with the housing base part, and the electrically conducting adhesive is easily added for electrically connecting the circuit means to the substrate circuit paths in a reliable and economical manner. Where the six-sided shield means is used, the shield means is easily grounded to the circuit means and one side of the shield means is adapted to be easily folded down and secured over the electrical circuit means after the circuit means and substrate circuit paths have been electrically connected with the conductive adhesive inside the device housing.

DESCRIPTION OF THE DRAWINGS

Other objects, advantages and details of the novel and improved condition-responsive accelerometer device of the invention appear in the following detailed description of preferred embodiments of the invention, the detailed description referring to the drawings in which:

FIG. 10 is a plan view of a gasket used in the device of FIG. 1;

FIG. 11 is a side elevation view of the gasket of FIG. 10;

FIG. 12 is a bottom view of the gasket of FIG. 10;

FIG. 13 is a plan view of an electrical circuit means used in the device of FIG. 1;

FIG. 14 is a side elevation view of the circuit means of FIG. 13;

DESCRIPTION OF THE PREFERRED EMBODIMENTS

Figure 1:
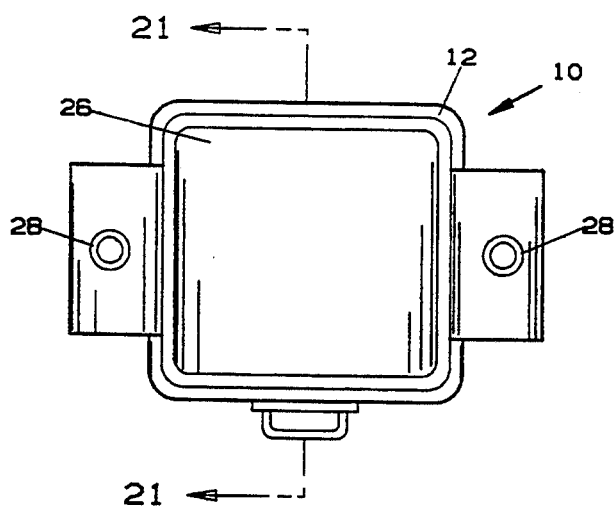
FIG. 1 is a plan view of an accelerometer unit provided by the invention.

Referring to the drawings, 10 in FIGS. 1 and 20-22 indicates a preferred embodiment of the accelerometer device of the invention which is shown to include a base or housing part 12 having a plurality of integral pins 14 arranged to receive an accelerometer unit 16 and electrical circuit means 18 as well as other accelerometer components thereon for securing the unit, circuit means and other components in compact, assembled relation to each other. Preferably, for example, the accelerometer device includes an electromagnetic interference shield 20, a gasket 22, a contaminant-excluding cover 24, and a lid 26 which are assembled with the accelerometer unit and circuit means in the sequence indicated in FIG. 20.

Figure 2:
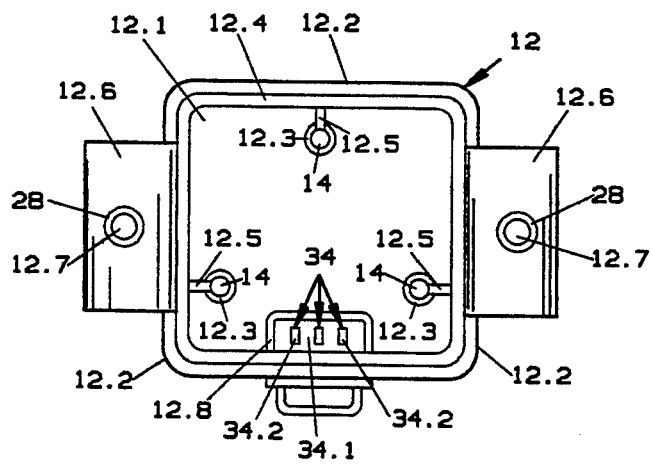
FIG. 2 is a plan view of a base part used in the device of FIG. 1.
Figure 3:
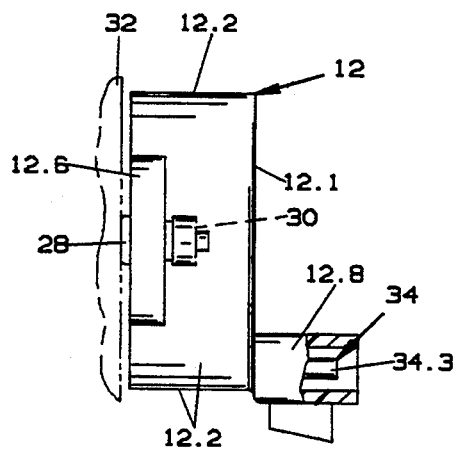
FIG. 3 is a side elevation view, partially in section of the base part shown in FIG. 2.

Preferably the housing or base part 12 is cup-shaped as shown in FIGS. 2 and 3 and has a bottom 12.1, side walls 12.2 and an open end. Three integral pins 14 upstand from the base bottom inside the cup shape, each pin having a shoulder 12.3 spaced from the bottom facing the open housing end. Preferably another shoulder 12.4 extends around the housing side wall, also facing and adjacent the open housing end. Preferably ribs 12.5 extend between the pins and side wall. The pins and the pin shoulders 12.3 provide three point support for the accelerometer unit and other components positioned on the pins and serve to locate the unit and other components relative to each other in the device 10. The unit 16 is suspended over the bottom 12.1. of the housing base to minimize stresses on the substrate during assembly and during subsequent temperature excursions. Mounting bosses 12.6 extend from two opposite sides of the housing. The housing is preferably formed of a strong, rigid, easily-molded, electrically-insulating material such as glass-filled nylon or the like, and preferably metal eyelets 28 of brass or the like are secured in openings 12.7 in the bosses to permit bolts as indicated 30 in FIG. 3 to be drawn down with selected torque for clamping the accelerometer device onto a vehicle or the like diagrammatically indicated at 32 without tending to lose the desired torque due to vibration and the like. Terminals 34 fit into holes in the base bottom 12.1 and are sealed and secured in a protective sleeve 12.8 in the housing part with a sealing epoxy 34.1 so that the upper ends 34.2 of the terminals are arranged in selected position relative to the pins 14 and to the housing pin shoulders 12.3 so that opposite terminal ends 34.3 extend from the housing in the sleeve 12.8.

Figure 4:
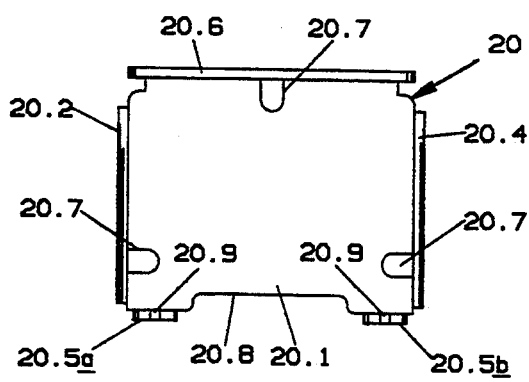
FIG. 4 is a plan view of a shield element used in the device of FIG. 1.
Figure 5:
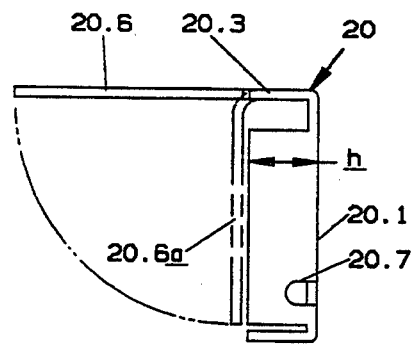
FIG. 5 is a side elevation view of the shield element shown in FIG. 4.

The electromagnetic interference shield 20 preferably comprises a thin electrically-conductive metal plate having six integral side elements 20.1-20.6 arranged to be folded as shown in FIGS. 4 and 5 to form a cube. One side element 20.1 disposed at the bottom of the cube has three openings preferably in the form of slots 20.7 which also extend up into the respective side elements 20.2-20.4 to fit over the pins 14 and the ribs 12.3 in the housing part 12. A clearance slot 20.8 is provided to fit over the terminals 34 in the housing base and another side element 20.5 is divided into two parts 20.5a, 20.5b, each of which has a portion 20.9 of reduced width adapted to serve as a ground connector terminal for the shield. The sixth side 20.6 of the shield is initially formed without bending as shown in solid line in FIG. 4 and 5 but is adapted to be folded down as indicated by broken line 20.6a in FIGS. 4 and 5 to overly the bottom 20.1 of the cube. Preferably each of the side elements 20.2-20.5 has a height h on the order of 0.3125 inches. If desired, side 20.6 includes an extension indicated by broken lines 20.6a adapted to be folded over to fit down between the parts 20.5a, 20.5b as will be understood.

Figure 6:
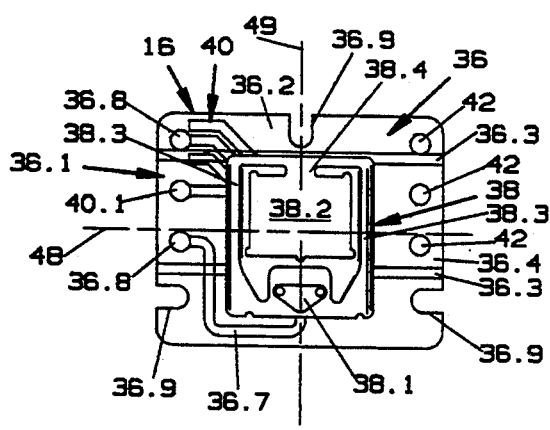
FIG. 6 is a plan view of an accelerometer unit used in the device of FIG. 1.
Figure 7:
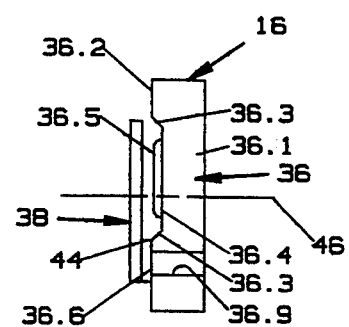
FIG. 7 is a side elevation view of the unit of FIG. 6.
Figure 8:
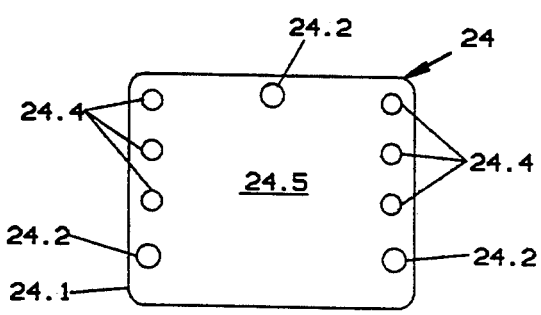
FIG. 8 is a plan view of a cover used in the device of FIG. 1.
Figure 9:
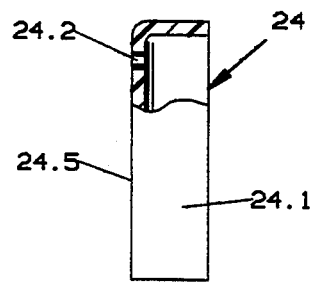
FIG. 9 is a side elevation view partially in section the cover of FIG. 8.
Figure 15:
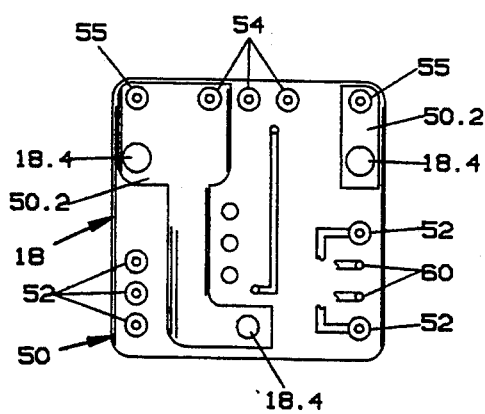
FIG. 15 is a bottom view of the circuit means of FIG. 13.
Figure 16:
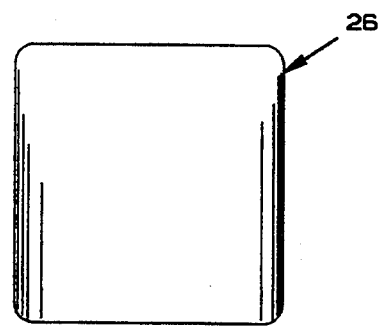
FIG. 16 is a plan view of a housing lid used in the device of FIG. 1.
Figure 17:
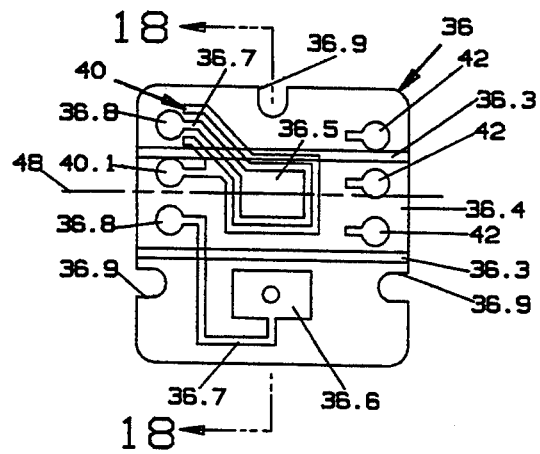
FIG. 17 is a plan view to enlarged scale of a substrate used in the accelerometer unit of FIG. 6.
Figure 18:
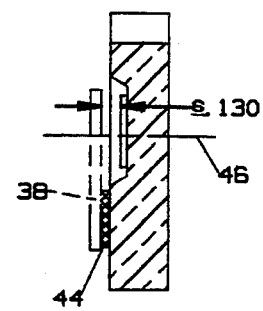
FIG. 18 is a section view along line 18—18 of FIG. 17.

The accelerometer unit 16 shown in FIG. 6 and 7 comprises a substrate 36 and a flat metal plate member 38. As shown particularly in FIGS. 17 and 18, the substrate has a recess such as a groove 36.1 formed in one surface 36.2 of the substrate extending across the surface and has edges 36.3 of the groove tapered at an angle of 45° relative to the flat bottom 36.4 of the groove. Preferably the substrate has a thickness on the order of 0.170 inches and the groove or other recess configuration has a depth of 0.002 inches. The thickness isolates the unit 16 from packaging-induced stresses during temperature change. Electrically conductive metal film means or the like are deposited on the substrate surface for defining a capacitor detect plate 36.5 on the substrate surface inside the groove 36.1, for defining a capacitor source plate connector pad 36.6 on the substrate surface outside the groove, and for defining circuit paths means 36.7 connected to the detect plate and source plate connector respectively. Preferably the circuit paths extend to terminal pads 36.8 arranged along one side of the substrate surface as shown in FIG. 17. Preferably the conductive film means also define a guard element 40 on the substrate surface extending around the detect plate and its associated circuit path and is connected to a corresponding terminal pad 40.1 at the edge of the substrate surface. Preferably corresponding terminal pads 42 are also formed along an opposite edge of the substrate surface as shown for a purpose to be discussed below. The substrate is also provided with openings 36.9, preferably in the forms of slots as shown, to fit over the pins 14 and ribs 12.5 in the housing part 12. Preferably the substrate is formed of a 94% alumina ceramic material having a coefficient of thermal expansion of $5.76 \times 10^{-6}$ cm/cm/°C. in the temperature range from 250° to 100° C. and has comparable thermal expansion properties over the range −40° C. to 125° C. Preferably the conductive film means are deposited by conventional screen printing techniques to be easily and accurately accommodated on the shallow-grooved substrate surface.

The flat metal plate member 38 in the accelerometer unit 16 is formed of a stiffly resilient, electrically-conductive metal, preferably by etching or the like, to have an attachment portion 38.1, a capacitor source plate portion 38.2, and integral resilient beam means 38.3, 38.4 arranged in a common plane. The attachment portion of the member is secured in electrically conductive relation to the capacitor source plate connector pad 36.6 on the substrate so that the beam means support the source plate 38.2 in selected spaced relation s from the detect plate 36.5 on the substrate to form a capacitor. Preferably the attachment portion of the plate member includes a central part 38.1a of selected width which is secured to the source plate connector means or pad preferably with a thin solder 44 to be precisely spaced relative to the detect plate and includes arms 38.1b of lesser width extending from the central part. Alternate conductive securing means such as rivets, conductive epoxy, etc., are also used if desired. The beam means include a pair of first beams 38.3 which extend in side-by-side parallel relation to each other from the respective arms 18.1a, 38.1b and include a second beam 38.4 having first parts 38.4a connected to the distal ends of the two first beams and a second part 38.4b extending from the first part to support the source plate 38.2. Preferably the plate member 38 has a thickness on the order of 0.030 inches. In that arrangement, the source plate is adapted to move toward or away from the detect plate in generally parallel relation to the detect plate to enhance signal linearity along a first axis indicated at 46 in FIGS. 7 and 18 in response to an acceleration force applied along that axis, thereby to change capacitance of the noted capacitor and provide an electrical signal corresponding to the acceleration force. The width thickness, and length selected for the arms 38.1b are substantial factors in determining the responsiveness of the unit 16 to acceleration force.

If desired, the space s is determined with improved uniformity and precision. That is, when very thin conductive metal film is deposited on the substrate 36 in conventional manner to define the detect plate 36.5 and source plate connector 36.6 as above described, the upper surfaces of the detect plate and source plate connector are formed at precisely desired levels relative to each other as determined by the depths of the substrate groove 36.1. A glass frit is then deposited over two spaced portions of the source connector 36.6, the frit including a bonding glass meltable at one temperature and glass rod of a small, precisely determined diameter of a material which remains shape-retaining at the melting temperature of the bonding glass. The glass frit is then melted and cooled so that the bonding glass adheres to the source plate connector 36.6 and to the rods, the relative proportion of the bonding glass in the frit being such that, after the frit is fired and cooled, the glass rods abut the source connector and protrude from the bonding glass, whereby the upper sides of the rods are in a precisely desired plane at a selected level higher than the upper surface of the detect plate 36.5 as will be understood. The electrically conductive solder 44 is then deposited over the remainder of the source plate connector, and preferably over the glass and rods, and the attachment portion 38.1 of the plate member is pressed down on top of the rods by a clamp (not shown) as the solder is melted and cooled, thereby to secure the attachment plate portion 38.1 in electrically conductive relation to the source plate connector at a precise level above the source plate connector so that the source plate 38.2 is disposed at a precisely determined spacing s over the detect plate 36.5. Note that, where the rods have a larger diameter, the groove 36.1 can be omitted from the substrate. However, the groove 36.1 is preferably used with somewhat smaller diameter rods for cooperating with the groove in determining the spacing s.

In accordance with this invention, the source plate 38.2 is provided with a pair of integral spacer portions 38.5 located at the distal end of the source plate adjacent the respective first beams 38.3. These spacer portions are adapted to engage first beams to limit movement of the source plate along a second axis 48 in the plane of the member 38 perpendicular to the first axis 46 as shown in FIGS. 6 and 17. In that way, the spacer portions limit stress on the first beams such as might result in damage to the first beams due to acceleration forces applied off the first axis during dropping of the accelerometer unit or the like. Preferably additional integral spacer portions 38.6 are provided on the source plate 38.2 located near the distal ends of the first beams adjacent respective first parts 38.4a of the second beam. Those additional spacer portions are adapted to engage the second beam to further limit movement of the source plate along the second axis, thereby to further limit stress on the first beams if the accelerometer unit should be dropped or the like.

Figure 19:
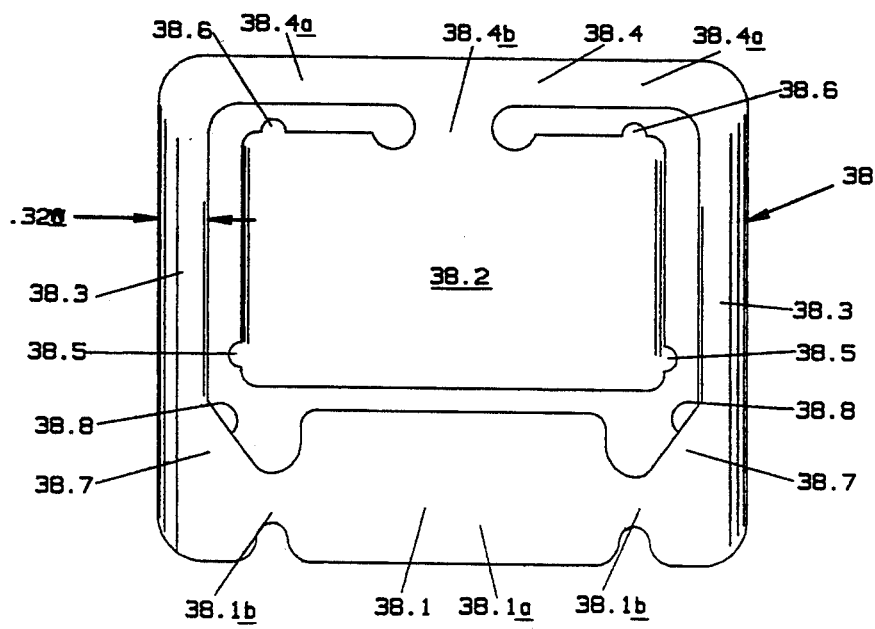
FIG. 19 is a plan view to further enlarged scale of a plate member used in the accelerometer of FIG. 6.
Figure 20:
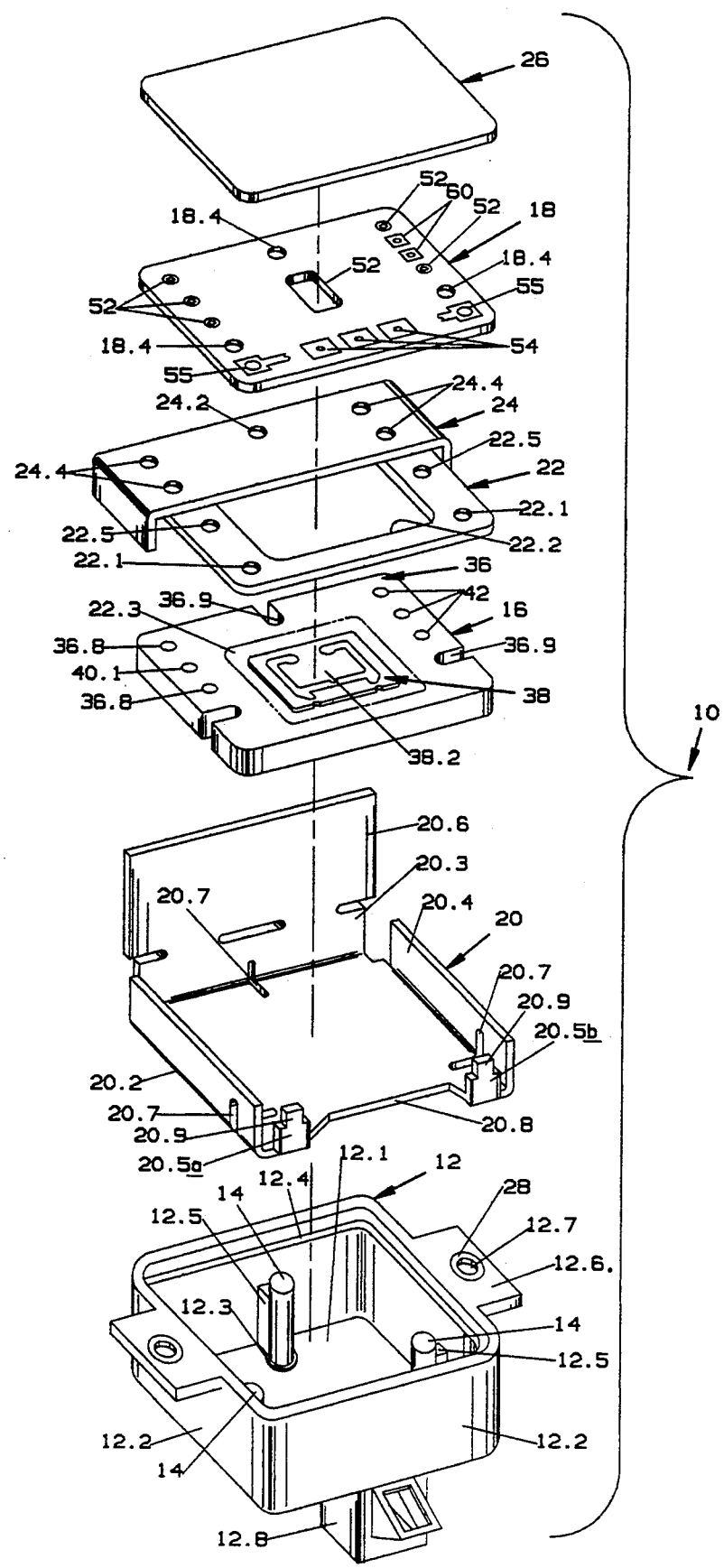
FIG. 20 is an exploded view of the device of FIG. 1 illustrating assembly of the device.
Figure 21:
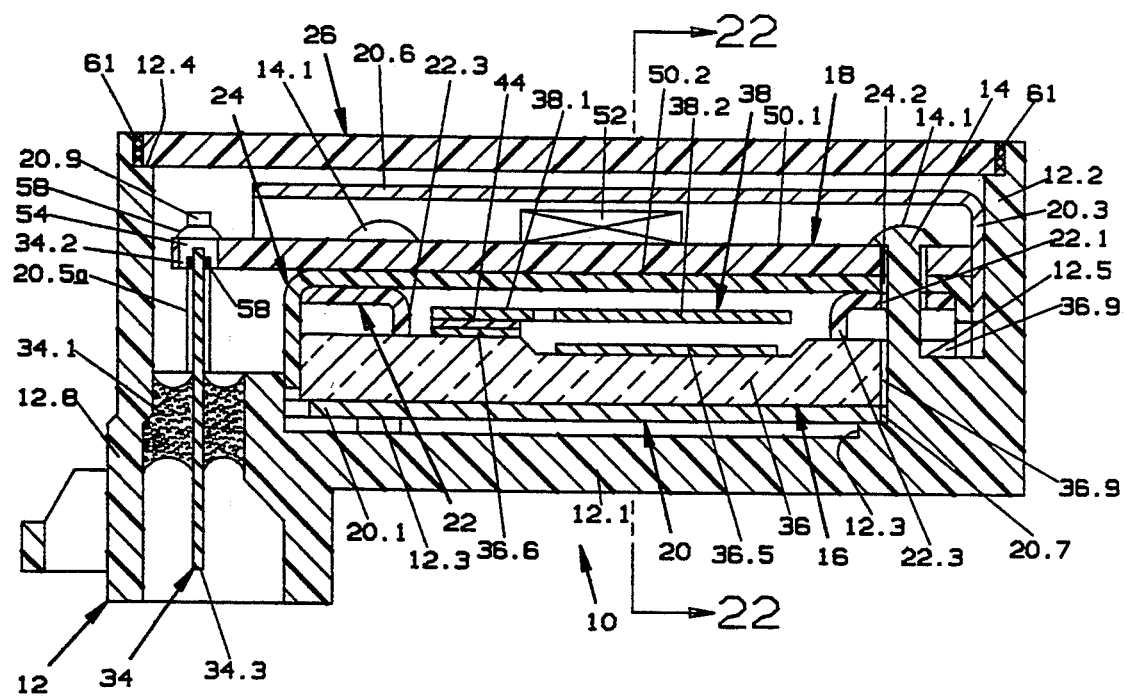
FIG. 21 is a section view to enlarged scale along line 21—21 of FIG. 1.

If desired, an additional spacer as indicated at 38.9 is adapted to engage the attachment portion 38.1 to limit flexing of the beam 38.4 toward the attachment portion in response to acceleration force applied along the third axis 49 perpendicular to each of the first and second axes (see FIG. 19).

In accordance with the invention, the first beams are also provided with a preferred configuration to further limit damage to the first beams due to acceleration forces along the second axis. Preferably, for example, the first beams are provided with a selected width w along a major portion of their length but flare to a larger width indicated at 38.7, preferably at a continuously increasing rate of flare as shown, until the first beam configuration blends smoothly into connection with its respective attachment portion arm 38.1b. That is, each first beam flares to a wider dimension from a point adjacent the distal end of the source plate to define a progressively smaller radius along the edge 38.8 of the first beam until it meets the attachment arm. If desired, the first beams 38.3 taper along their entire length getting wider toward the attachment portion but in the preferred embodiment the beams 38.3 have the configuration as shown. The first beam configurations minimize the stress concentrations (lowers and distributes stress) during dropping or the like.

Preferably the metal plate member 38 is formed of Alloy 42, an alloy having a nominal composition by weight of 42 percent nickel and the balance iron. That alloy has a coefficient of thermal expansion of $5.76 \times 10^{-6}$ cm./cm./° C. in the temperature range from 25° to 100° C. matching that of the substrate 36 and preferably have comparable expansion properties in the range from $-40°$ C. to 125° C. so that the performance of accelerometer displays improved temperature independence and is adapted to withstand extensive thermal cycling over a long service life.

The gasket 22, preferably formed of molded rubber or the like, is preferably formed in picture-frame shape as shown in FIGS. 10–12 and is preferably provided with openings 22.1 adapted to fit over the pins 14 in the housing base part. The gasket also has a central window 22.2 and preferably has a ridge 22.3 formed substantially around the window. Preferably a vent 22.4 is left in this window ridge. Preferably the gasket also has two rows of three holes 22.5, each row being disposed along two opposite sides of the gasket and each hole being also provided with a single ridge 22.6 around each hole. The holes 22.5 are located so that, when the accelerometer unit 16 is mounted on the pins 14 in the housing base, the window 22.2 fits around the metal plate member 38 so that the ridge 22.3 bears against the ceramic substrate 36 and the holes 22.5 in the gasket align with the respective terminal pads 36.8, 40.1 and 42 on the substrate. If desired for economy, the gasket is blanked from flat stock omitting the ridges 22.3 and 22.6. The cover 24 is preferably cup-shaped and is sized to fit snugly around the gasket 22 so that sides 24.1 of the cover are adapted to extend down over edges of the substrate 36. In that arrangement, the bottom 24.5 of the cover extends over the plate member 38 and is positioned to limit movement of the source plate portion of the plate member upward along the first axis 46 if the device is subjected to excessive acceleration force. The cover is provided with openings 24.2 and slots 24.6 adapted to fit over the pins 14 in the housing base and has holes 24.4 also arranged to align with the gasket holes 22.5 and with the substrate terminal pads.

Preferably the cover 24 is formed of what is commonly called a liquid crystal polymer having a relatively low coefficient of thermal expansion and is provided with glass-filling on the order of 30% to provide the cover with a coefficient of thermal expansion of $5.76 \times 10^{-6}$ cm/cm/° C. to match that of the substrate 36 and metal plate member 38 to avoid development of stresses on the accelerometer unit while the cover 24 is fitted closely therearound.

The electrical circuit means 18 comprises an electrically insulating circuit board 50 having signal-conditioning components such as integrated circuit unit 52 and the like mounted on one side 50.1 of the circuit board. Preferably the circuit means is also provided with a ground plane on an opposite side of the board as is diagrammatically indicated at 50.2. The signal conditioning components are of any conventional type and preferably comprise temperature-compensating and calibrating circuit components such as are shown in commonly-assigned, copending application for U.S. Pat. Ser. No. 786,852 filed Nov. 1, 1991 now U.S. Pat. No. 5,241,850. As the signal-conditioning components in the circuit means 18 can be of any generally conventional type, they are not further described herein and it will be understood that the components in the circuit means are adapted to be connected to the detect plate and source plate of the capacitor in the accelerometer unit 16 via circuit paths 18.1 to amplify, calibrate or otherwise condition the initial electrical signal provided by the accelerometer unit, are adapted to be connected to the housing terminals 34 via circuit paths 18.2 to provide an output signal corresponding to acceleration forces applied along the first axis 46, and are adapted to be connected to the EMI shield 20 via circuit paths 18.3. The circuit board is provided with plated-through holes 54 and 55 or the like at the locations of the circuit paths 18.2 and 18.3 on the circuit board. In accordance with the invention, openings 18.4 are provided in the electrical circuit means to fit over the pins 14 in housing base. Preferably also eyelets or hollow rivets 52 are mounted on the circuit board (clamped or soldered to the circuit paths 18.1 in conventional manner) to extend through the circuit board (see FIG. 22) and to extend from the opposite side 50.2 of the circuit board to fit into corresponding holes 24.4 in the cover 24.

In assembling the accelerometer device 10, the accelerometer unit 16 is fitted inside the EMI shield 20, the gasket 22 is positioned on the accelerometer unit around the plate member 38, and the cover 24 is fitted over the gasket. The cover is proportioned to fit around the side of the substrate 36 and to fit into the cube formed by the shield 20. The electrical circuit means 18 is also disposed in overlying relation to the cover 24 and the shield is proportioned so its side elements extend around the edges of the circuit means, the ground plane on the circuit means being disposed facing the cover 24. The cover shape properly aligns the gasket and cover with the accelerometer unit 16 and with the shield 20, and the extension of the hollow rivet ends 52.1 from the circuit means into the cover holes 22.4 aligns the circuit means with the cover. Those sub-assembled elements of the accelerometer device are then inserted into the housing base 12 so that the openings in the shield, substrate, gasket, cover and circuit means fit over the pins 14 and snugly position the accelerometer mechanism in the housing base. In inserting the sub-assembled elements of the mechanism, the circuit means is oriented so that the housing terminals 34 fit into the plated-through holes 54 in the circuit paths 18.2 and so that the EMI shield terminals 20.9 fit into the plated through holes 55 in the circuit paths 18.3. The distal ends of the pins 14 are then staked or otherwise headed-over as indicated at 14.1 in FIG. 21 for securing elements of the accelerometer mechanism in fixed relation to each other.

Figure 22:
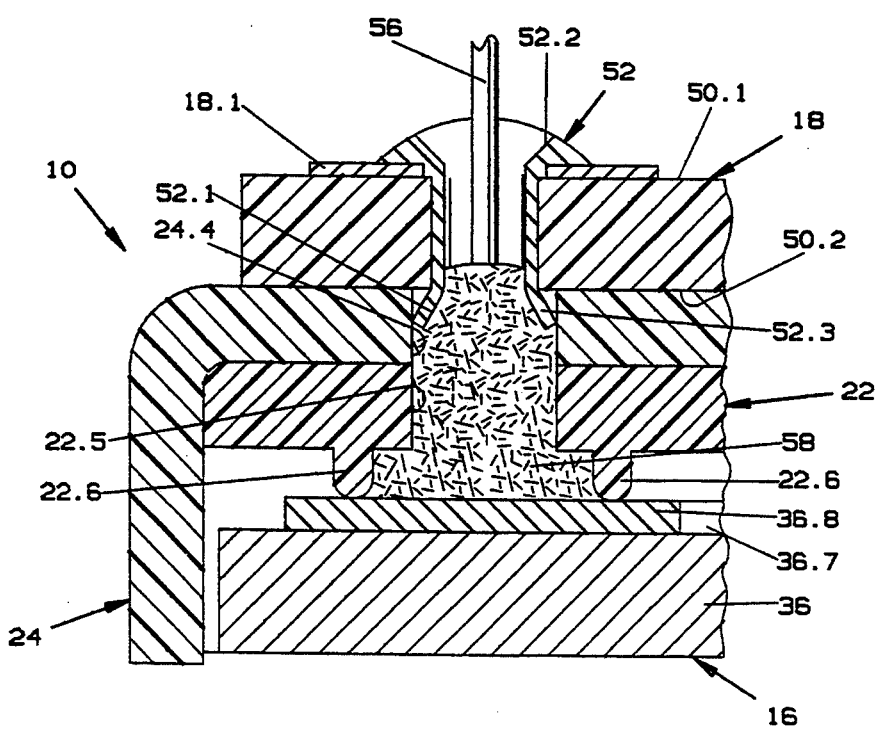
FIG. 22 is a section view to further enlarged scale along line 22—22 of FIG. 21 illustrating introduction of conductive adhesive in the device of FIG. 1

With the sixth side 20.6 of the ground shield still in its initially unfolded position, the circuit paths 18.2 and 18.3 on the circuit means are electrically connected to and secured to the terminals 34 and 20.9 respectively with an electrically conductive material such as a silver-filled epoxy 58. (See FIG. 21.) In addition, a hollow dispensing tube 56 or the like is inserted into each of the hollow rivets 52 and an electrically-conductive adhesive 58 such as a silver-filled epoxy is inserted into each hollow rivet as shown in FIG. 22 to electrically connect the detect plate and source plate terminal pads 36.8 and the guard pad 40.1 on the substrate 36 to the circuit paths 18.1 on the circuit means. Preferably the tube 56 is withdrawn as the conductive adhesive 58 is introduced so that the holes 22.5 in the gasket, the holes 24.4 in the cover, and the hollow rivets or eyelets 52 are substantially and uniformly filled with the conductive adhesive. Preferably the rivets are tapered as at 52.2 and 52.3 to facilitate introduction of the adhesive. Preferably the hollow rivets 52 at both sides of the circuit board are filled with a conductive adhesive, the rivets at the right side of this circuit board as viewed in FIG. 3 serving to bond to pads 42 on the substrate to provide symmetrical support for the circuit board in the structure after the adhesive is cured. With the shield side 20.6 still raised, the electrical circuit means 18 is then calibrated or adjusted relative to the accelerometer unit assembled with it as is more thoroughly described in the copending patent application Ser. No. 786,852 filed Nov. 1, 1991, now U.S. Pat. No. 5,241,850 previously described, the disclosure of which is incorporated herein by this reference. For that purpose, calibration terminal pads are provided on the circuit means 18 as is diagrammatically indicated at 60 in FIG. 13. The sixth side 20.6 of the EMI shield is then folded over the circuit means 18 and, if desired, is secured to the shield side 20.2, 20.4 with an adhesive or the like. If desired, the side extension 20.6 a is folded at 90° to the rest of side 20.6 before the side 20.6 is folded over the circuit means 18. The lid 26 is disposed with its shoulder 26.1 facing outwardly, and is secured with an adhesive 61 or the like to the housing part 12 disposed on the lid shoulder, the lid preferably being disposed on the housing shoulder 12.4 to be located in spaced relation to the accelerometer mechanism inside the housing for enclosing the mechanism in the housing.

In that arrangement, the accelerometer elements are each adapted to be easily manufactured. The discrete accelerometer units 16 are adapted to be made and separately tested ready for use in making assembled devices 10. The discrete circuit means 18 are also adapted to be made and separately tested. The procedures used in manufacturing the circuit means do not subject the accelerometer unit to injury during manufacture so the units are efficiently made. The area of the ceramic substrate is kept small and compact but the thickness is substantial to provide high rigidity so that improved performance is achieved at reduced ceramic material unit cost. Use of the EMI shield as a single unit simplifies device assembly and obviates need for ground plane metallizing on the back of the substrate, and the use of the ground plane, easily applied on a circuit board, between the accelerometer unit capacitor and the circuit means 18 is believed to improve performance at low cost. The gasket 22 and cover 24 cooperate with each other to exclude contaminants from the detect and source plates in the accelerometer unit capacitor to provide high reliability over a long service life. The use of the gasket guide holes for retaining the conductive adhesive used in electrically connecting the circuit means to the accelerometer further avoids introduction of adhesive contaminants between the detect and source plate. Also, the structure of the accelerometer is such that the separately-made accelerometer elements are assembled and secured together by the housing pins before the conductive adhesive is applied so that the adhesive provides a highly secure electrical connection between the physically discrete circuit means and accelerometer unit and even enhances the security of the fastening of the circuit means and unit in the assembled device. The cover 24 and bottom of the substrate groove serve as top and bottom stops respectively limiting movement of the source plate in response to substantial acceleration force. The shallow ceramic substrate groove and close overlay of the cover 24 tends to provide squeeze film vibration damping. The cover vent avoids vacuum or reduced pressure conditions inside the gasket such as might lower the top stop inadvertently. The substrate groove and flat member plate cooperate to permit very small detect/source plate spacings to be uniformly achieved for improved device performance at low cost. Further, the resulting device is rugged and compact and free of vibration characteristic that might reduce device performance.

It should be understood that although particular embodiments of the invention have been described by way of illustrating the invention, the invention includes all modification and equivalents of the disclosed embodiments following within the scope of the appended claims.

We claim:

1. In a condition-responsive device comprising a ceramic substrate having means thereon responsive to a selected condition to provide an electrical signal and having electrically-conductive means on a surface of the substrate defining circuit path means connected to the condition-responsive means, and comprising signal-conditioning electrical circuit means, a base part having integral pins extending through openings in the substrate and electrical circuit means securing the electrical circuit means in overlying relation to the substrate, and electrically conductive means extending between the circuit means and the substrate electrically connecting the electrical circuit means to the circuit path means on the substrate for conditioning the electrical signal to provide an output signal corresponding to the selected condition.

2. In a condition-responsive device comprising a ceramic substrate having means thereon responsive to a selected condition to provide an electrical signal and having electrically-conductive means on a surface of the substrate defining circuit path means connected to the condition-responsive means, and comprising signal-conditioning electrical circuit means, a base part having integral pins extending through openings in the substrate and electrical circuit means securing the electrical circuit means in overlying relation to the substrate, and electrically conductive adhesive means extending between the electrical circuit means and the substrate electrically connecting the electrical circuit means to the circuit path means on the substrate for conditioning the electrical signal to provide an output signal corresponding to the selected condition.

3. A condition-responsive device according to claim 2 wherein the condition-responsive means comprise a plurality of components and the pins extend through openings in a plurality of the components and secure the components in assembled relation to each other to form the condition-responsive means.

4. An accelerometer device comprising an electrically insulating ceramic substrate having electrically conductive means on one surface defining a capacitor detect plate, capacitor source plate connector means, and circuit path means connected to the detect plate and to the source plate connector means; an electrically conductive metal plate member having an attachment portion secured in electrically conductive relation to the source plate connector means, a capacitor source plate portion, and integral resilient beam means extending between the attachment and source plate member portions supporting the source plate portion of the member in spaced relation to the detect plate to form a capacitor and to be movable relative to the detect plate in response to an acceleration force to provide an electrical signal; signal-conditioning electrical circuit means; a base having integral pins extending through openings in the substrate and the electrical circuit means securing the electrical circuit means in overlying relation to the plate member; and an electrically conductive adhesive extending between the electrical circuit means and the substrate electrically connecting the electrical circuit means to the circuit path means on the substrate for conditioning the electrical signal to provide an output signal corresponding to the acceleration force.

5. An accelerometer device according to claim 4 wherein the ceramic substrate has a recess with a flat bottom and a selected depth in said one surface, the detect plate is defined within the recess on the recess bottom, and the capacitor source plate connector means is defined outside the recess, and wherein the electrically conductive metal plate member has said attachment and source plate portions and said beam means disposed in a common plane, the attachment portion of the member being secured in overlying relation to the source plate connector means outside the recess to locate the source plate portion of the member in selected spaced relation to the detect plate on the recess bottom.

6. An accelerometer device according to claim 5 wherein the beam means include a pair of first beams extending away from the attachment portion of the plate member to dispose distal ends of the first beams at a location spaced from the attachment portion and a second beam extending from the distal ends the first beams towards the attachment portion to dispose the capacitor source plate portion of the member in said selected spaced relation to the detect plate between the first beams to be movable along a first axis toward the detect plate in response to an acceleration force applied along the first axis, the source plate portion of the member having integral spacer portions extending toward the respective first beams at a location adjacent the attachment member portion to engage the first beams and limit movement of the source plate member portion toward the first beams in response to acceleration forces along a second axis in said plane perpendicular to the first axis to reduce stress in the first beams in response to the acceleration force along the second axis.

7. An accelerometer according to claim 6 wherein the second beam comprises a first portion connecting distal ends of the first beams and a second portion extending from the first portion to the source plate portion of the member, the source plate member portion having additional integral spacer portions extending toward the first portion of the second beam adjacent junctions of the second beam with distal ends of the respective first beams to engage the second portion of the second beam and further limit movement of the source plate member portion toward the first beams in response to acceleration forces along the second axis to further reduce stress in the first beams in response to the acceleration force along the second axis.

8. An accelerometer according to claim 7 wherein the source plate portion has third spacer means extending from the distal end of the source plate portion extending toward the attachment portion of the member to engage the attachment portion and limit stress in the second beam means in response to acceleration force along a third axis perpendicular to said first and second axes.

9. An accelerometer device according to claim 6 wherein the attachment portion of the plate member has a central part of selected width soldered to the source plate connector means and has arms of selected lesser width extending away from each other from respective opposite sides of said central part connected to the respective first beams, the source plate portion of the member has a distal end disposed in selected spaced relation to said central part of the attachment portion of the member, and each of the first beams has a selected width along a major part of its length and flares to a greater width in a continuously increasing rate from a point adjacent the distal end of the source plate member portion to a respective arm of the attachment plate portion for permitting selected movement of the source plate member portion in response to acceleration force along the first axis while reducing risk of damage to the first beams from acceleration force along the second axis.

10. An accelerometer according to claim 4 wherein the ceramic substrate comprises 94% alumina and the metal plate member comprises an alloy having a nominal composition by weight of 42 percent nickel and the balance iron and has substantially the same coefficient of thermal expansion as the substrate in the temperature range from 25° C. to 100° C.

11. An accelerometer according to claim 4 having gasket means disposed on the substrate around the plate member, a cover disposed on the gasket means extending over the plate member to exclude contaminants from between the detect plate and source plate portions of the capacitor, the pins extending through openings in the cover securing the cover against the gasket means for excluding the contaminants.

12. An accelerometer according to claim 11 wherein the cover is positioned to limit movement of the source plate portion of the plate member in one direction in response to acceleration force along a first axis away from the detect plate.

13. An accelerometer according to claim 11 having holes in the gasket means aligned with corresponding holes in the cover providing a sealed passage from the electrical circuit means to the circuit path means and having the electrically conducting adhesive extending through the holes for electrically conducting the electrical circuit means with the circuit path means on the substrate while shielding the plate member from contamination by the adhesive.

14. An accelerometer according to claim 13 wherein the electrical circuit means comprises a circuit board having signal-conditioning means mounted thereon, a plurality of hollow rivets connected to the signal-conditioning means extend through the board into respective holes in the cover positioning the electrical circuit means on the cover and extending into the sealed passage, and the electrically conducting adhesive extends into the respective hollow rivets in electrically conducting relation to the rivets for electrically connecting the signal-conditioning means to the circuit paths on the substrate.

15. An accelerometer device comprising an electrically insulating housing base having integral pins upstanding from the base; an electrically insulating ceramic substrate having a groove with a flat bottom and a selected depth extending across one surface of the substrate and having electrically conductive film means on said one surface defining a capacitor detect plate inside the groove bottom, capacitor source plate connector means outside the groove, and circuit path means connected to the detect plate and source plate connector means; an electrically conductive metal plate member having an attachment portion, a capacitor source plate portion, and integral resilient beams extending between the attachment and source plate portions disposed in a common plane, the attachment portion being secured in electrically conductive relation to the source plate connector means outside the groove to dispose the source plate member portion in spaced relation to the detect plate on the groove bottom to form a capacitor and to be movable relative to the detect plate in response to an acceleration force to provide an electrical signal; gasket means disposed on the substrate around the plate member; a cup-shaped cover fitted over the gasket means and around the substrate to extend over the plate member for excluding contaminants from between the detect and source plate portions of the capacitor, the cover being positioned to limit movement of the source plate member portion away from the detect plate in response to an acceleration force; signal-conditioning electrical circuit means disposed on the cover; the pins extending through openings in each of the substrate, gasket means, cover and electrical circuit means and being staked at distal ends of the pins for securing the substrate, gasket means, cover and electrical circuit means in assembled relation to form an accelerometer mechanism; electrically conductive adhesive extending between the electrical circuit means and substrate electrically connecting the electrical circuit means to the circuit path means for conditioning the electrical signal to provide an output signal corresponding to the acceleration force; and a second housing part secured to the base enclosing the accelerometer mechanism.

16. An accelerometer device according to claim 15 wherein the housing base has a cup shape with a bottom, side walls and an open end, has three of said pins upstanding from the base bottom inside the cup shape, has first shoulder means on the respective pins spaced from the base bottom and facing the open base end, and has second shoulder means facing the open base end adjacent the open end, the acceleration mechanism is supported on the first shoulder means spaced from the base bottom, and a lid is secured on the second shoulder means spaced from the acceleration mechanism enclosing the mechanism.

17. An accelerometer device according to claim 16 having shield means at least partially surrounding the accelerometer mechanism to shield the capacitor and electrical circuit means from electromagnetic interference, and having the pins extending through openings in the shield means securing the shield means in assembled relation with the mechanism.

18. An accelerometer device according to claim 17 wherein the shield means extends around six sides of the accelerometer mechanism and is connected to the electrical circuit means to be electrically grounded.

19. An accelerometer device according to claim 18 wherein the shield means comprises a metal sheet having six integral side elements foldable to define a cube surrounding the accelerometer mechanism, having openings in one of said side elements fitted over the pins resting on the first shoulder means, having four of said side elements upstanding from said one side element around respective sides of the substrate, gasket means, cover and electrical circuit means fitted on the pins, having integral ground means on one of said four other side elements fitted into openings in the electrical circuit means to be grounded, and having a sixth one of said side elements folded over the staked distal ends of the pins and secured in overlying relation to the mechanism.

20. An accelerometer device according to claim 18 wherein the electrical circuit means comprises a circuit board, signal-conditioning components disposed on one side of the circuit board, and a ground plane disposed on an opposite side of the circuit board, the electrical circuit means being disposed on the cover with the ground plane disposed between the signal-conditioning components and the capacitor for providing electromagnetic shielding therebetween.

21. An accelerometer device according to claim 16 having integral bosses extending from two opposite sides of the housing base, having apertures in the bosses for receiving bolts to mount the device, and having metal eyelets secured in the apertures to permit bolts to clamp the eyelets with selected torque in mounting the device.

22. An accelerometer device according to claim 15 wherein glass rods of selected diameter are disposed on the capacitor source plate connector means, bonding glass secures the rods to limited portions of the source plate connector means so that the rods protrude from the bonding glass, the attachment portion of the plate member abuts the glass rods to dispose the source plate member portion in said spaced relation to the detect plate, and solder means secure and electrically connect the plate member to the source plate connector means.

23. An accelerometer unit comprising an electrically insulating ceramic substrate having a recess with a flat bottom and a selected depth in one surface of the substrate and having electrically conducting means on said one surface defining a capacitor detect plate within the recess on the recess bottom, capacitor source plate connector means outside the recess, and circuit path means connected to the detect plate and source plate connector means, and an electrically conductive metal plate member having an attachment portion, a source plate portion, and integral resilient beam means extending between the attachment and source plate member portions disposed in a common plane, the attachment portion of the plate member being secured in electrically conductive, overlying relation to the source plate connector means on the substrate outside the substrate recess to locate the source plate portion of the member in selected spaced relation to the detect plate to form a capacitor and to be movable relative to the detect plate in response to an acceleration force to provide an electrical signal.

24. An accelerometer unit according to claim 23 wherein the beam means include a pair of first beams extending away from the attachment portion of the plate member to dispose distal ends of the first beams at a location spaced from the attachment portion and a second beam extending from the distal ends of the first beams towards the attachment portion to dispose the capacitor source plate portion of the member in said selected spaced relation to the detect plate between the first beams to be movable along a first axis toward the detect plate in response to an acceleration force applied along the first axis, the source plate portion of the member having integral spacer portions extending toward the respective first beams at a location adjacent the attachment member portion to engage the first beams and limit movement of the source plate member portion toward the first beams in response to acceleration forces along a second axis in said plane perpendicular to the first axis to reduce. stress in the first beams in response to the acceleration force along the second axis.

25. An accelerometer unit according to claim 24 wherein the second beam comprises a first portion connecting distal ends of the first beams and a second portion extending from the first portion to the source plate portion of the member, the source plate member portion having additional integral spacer portions extending towards the first portion of the second beam adjacent junctions of the second beam with the distal ends of the respective first beams to engage the second portion of the second beam and further limit movement of the source plate member portion toward the first beam in response to acceleration forces along the second axis to further reduce stress in the first beams in response to acceleration forces along the second axis.

26. An accelerometer unit according to claim 25 wherein the source plate portion has third spacer means extending from the distal end of the source plate portion extending toward the attachment portion of the member to engage the attachment portion and limit stress in the second beam means in response to acceleration force along a third axis perpendicular to said first and second axes.

27. An accelerometer unit according to claim 23 wherein the attachment portion of the plate member has a central part selected width soldered to the source plate connector means and has arms of selected lesser width extending away from each other from respective opposite sides of said central part connected to the restrictive beams, the source plate portion of the member has a distal end disposed in selected space relation to said central part of the attachment portion of the member, and each of the first beams has a selected width along a major part of its length and flares to greater width in a continuously increasing rate from a point adjacent the distal end of the source plate member portion to a respective arm of the attachment plate portion for permitting selected movement of the source place member portion in response to acceleration force along the first axis while reducing risk of damage to the first beams from acceleration force along the second axis.

28. An accelerometer unit according to claim 23 wherein the ceramic substrate comprises 94 percent alumina and the metal plate member comprises an alloy having a nominal composition by weight of 42 percent nickel and the balance iron and has substantially the same coefficient of thermal expansion as the substrate in the temperature range from 25° C. to 100° C.

29. An accelerometer unit according to claim 23 wherein the recess comprises a groove extending across the surface.

30. An accelerometer unit comprising an electrically insulating ceramic substrate having a surface and having electrically conducting means on said surface defining a capacitor detect plate and circuit path means connected to the detect plate and source plate connector means, and an electrically conductive metal plate member having an attachment portion, a source plate portion, and integral resilient beam means extending between the attachment and source plate member portions disposed in a common plane, the attachment portion of the plate member being secured in electrically conductive, overlying relation to the source plate connector means on the substrate to locate the source plate portion of the member in selected spaced relation to the detect plate to form a capacitor and to be movable relative to the detect place in response to an acceleration force to provide an electrical signal, the beam means including a pair of first beams extending away from the attachment portion of the plate member to dispose distal ends of the first beams at a location spaced from the attachment portion and a second beam extending from the distal ends of the first beams towards the attachment portion to dispose the capacitor source plate portion of the member in said selected spaced relation to the detect plate between the first beams to be movable along a first axis toward the detect plate in response to an acceleration force applied along the first axis, the source plate portion of the member having integral spacer portions extending toward the respective first beams at a location adjacent the attachment member portion to engage the first beams and limit movement of the source plate member portion toward the first beams in response to acceleration forces along a second axis in said plane perpendicular to the first axis to reduce stress in the first beams in response to the acceleration force along the second axis.

31. An accelerometer unit according to claim 30 wherein the second beam comprises a first portion connecting distal ends of the first beams and a second portion extending from the first portion to the source plate portion of the member, the source plate member portion having additional integral spacer portions extending towards the first portion of the second beam adjacent junctions of the second beam with the distal ends of the respective first beams to engage the second portion of the second beam and further limit movement of the source plate member portion toward the first beam in response to acceleration forces along the second axis to further reduce stress in the first beams in response to acceleration forces along the second axis.

32. An accelerometer unit according to claim 31 wherein the source plate portion has third spacer means extending from the distal end of the source plate portion extending toward the attachment portion of the member to engage the attachment portion and limit stress in the second beam means in response to acceleration force along a third axis perpendicular to said first and second axes.

33. An accelerometer unit according to claim 30 wherein the attachment portion of the plate member has a central part selected width soldered to the source plate connector means and has arms of selected lesser width extending away from each other from respective opposite sides of said central part connected to the restrictive beams, the source plate portion of the member has a distal end disposed in selected space relation to said central part of the attachment portion of the member, and each of the first beams has a selected width along a major part of its length and flares to greater width in a continuously increasing rate from a point adjacent the distal end of the source plate member portion to a respective arm of the attachment plate portion for permitting selected movement of the source plate member portion in response to acceleration force along the first axis while reducing risk of damage to the first beams from acceleration force along the second axis.

* * * * *